April 8, 1941.  F. C. WERNER  2,237,642
BENCH COOKY MACHINE
Filed Aug. 3, 1939  2 Sheets-Sheet 1

INVENTOR.
FRANK CHARLES WERNER
BY Thomas G. Boman
ATTORNEY.

April 8, 1941.   F. C. WERNER   2,237,642
BENCH COOKY MACHINE
Filed Aug. 3, 1939   2 Sheets-Sheet 2
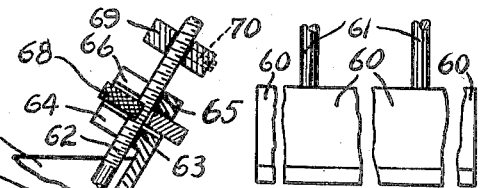
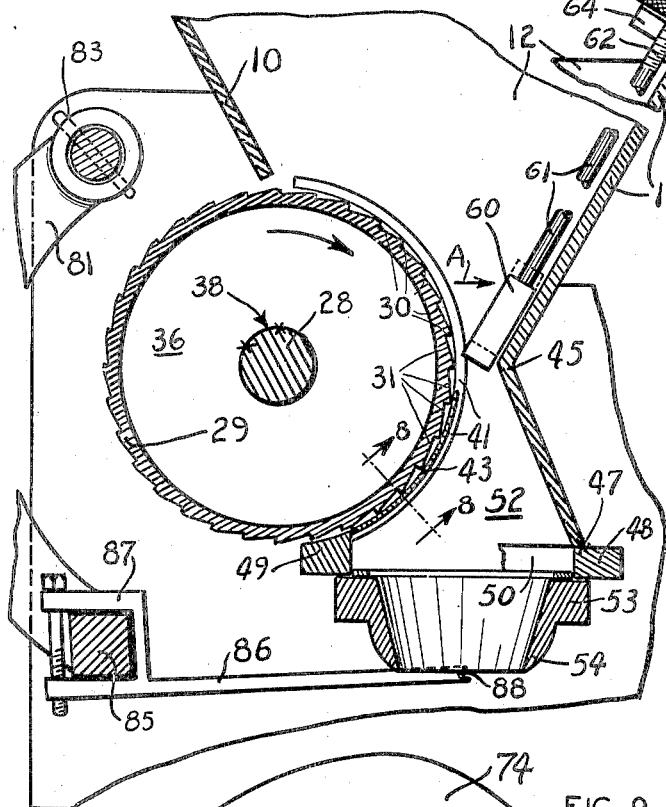
HORIZONTAL
INVENTOR.
FRANK CHARLES WERNER
By Thomas G. Boman.
ATTORNEY.

Patented Apr. 8, 1941

2,237,642

UNITED STATES PATENT OFFICE 2,237,642

BENCH COOKY MACHINE

Frank Charles Werner, Grand Rapids, Mich.

Application August 3, 1939, Serial No. 288,188

9 Claims. (Cl. 107—8)

My invention relates generally to dough forming apparatus and more particularly to a cooky machine.

In machines of a certain type rollers force the dough through a series of restricted openings and a moving blade or wire severs the flowing streams of material at desired intervals. These machines are usually called "wire cut" machines.

In order to change the quantity of dough between the cuts some prior devices utilize two rollers revolving toward one another and vary the speed thereof. Others swing the axes of the rollers towards or away from each other.

My device has a very important advantage over either of the above constructions inasmuch as I use only a single roller and thus not only reduce the initial cost and upkeep of the machine but I also obtain a better running machine which gives better results inasmuch as the dough may be more easily controlled.

Another advantage lies in the fact that my construction may be set to operate at a constant predetermined speed, the size of the blanks of cooky dough being governed by the adjustment of the size of the neck portion or orifice adjacent the center of the roller.

Yet another advantage lies in my construction wherein I use only a single shaft, this shaft carrying the dough roller and both of the cams as will later be fully set forth.

Also, I am able to utilize a very thin plate between the compression chamber and the roller, the novel feature being the provision of a central land whereby any breaking engagement between the roller teeth and the top of the plate is absolutely prevented.

There are other objects, advantages and features of construction and organization, and details of elements, as will be made manifest in the ensuing description, it being understood that modifications, variations and adaptations may be resorted to within the spirit, scope and principle of the invention as it is more directly claimed hereinafter.

Describing in illustration, and not in limitation, and referring to the drawings, wherein like numerals refer to like parts throughout the several views:

Fig. 4 is a longitudinal cross sectional view through the machine, this view being taken along the plane of the line 4—4 of Fig. 1.

Fig. 5 is a front view of the sliding adjusting member looking as indicated by the arrow A, see Fig. 4.

Fig. 6 is a side view of one of the cam locking members, this view being taken along the line 6—6 of Fig. 7.

Fig. 7 is a view at right angles to the showing of Fig. 6.

Fig. 8 is a fragmentary sectional view taken along the line 8—8 of Fig. 4.

Fig. 9 is a full size view of the two cams which are used.

Fig. 10 is drawn to a reduced scale showing the path of the wire.

Numeral 10 indicates the rear slanting side of a hopper, 11 the front side and 12 and 13 the ends thereof.

Figure 1:
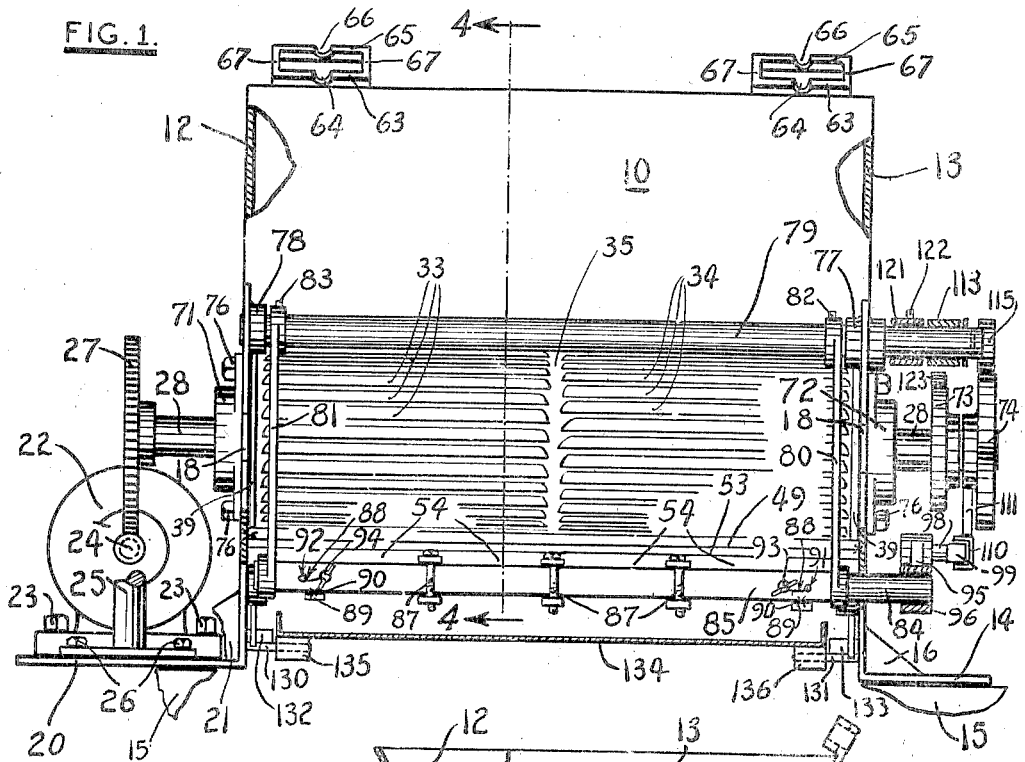
Fig. 1 is a rear view of a bench type of machine constructed in accordance with my invention, parts being broken away in order to expedite the disclosure.
Figure 2:
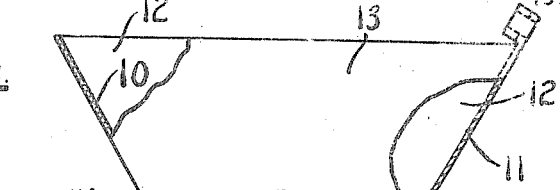
Fig. 2 is an end view of the right hand end of Fig. 1, parts also being broken away in this figure.

The end 13, see Fig. 2 particularly, is enlarged at its lower portion and extended forwardly and rearwardly as shown, and is then extended outwardly to form the base 14. This base 14, see Fig. 1, may rest upon a support or table 15. A web 16 may diagonally join the base 14 and the end 13 to strengthen the construction.

The enlarged portion of the end 13 is cut away at 17 to permit the unrestricted swinging, within limits, of the cutting wire frame shaft, as will later be described, and also a slot 18 is formed in both of the ends 12 and 13 to permit the assembly entry and removal, when desired, of the roller construction assembly. This will be readily understood as the description proceeds.

The other end 12 is similarly enlarged at its lower end and is bent outwardly to form a supporting flange 20, a web 21 reinforcing the same. See Fig. 1. The flange 20 carries a driving motor 22 by the bolts 23 and a worm 24 extends from the motor shaft and is revolvably mounted in a bracket 25 bolted at 26 onto the flange 20. This bracket is shown partly broken away.

The worm meshes with and drives the worm gear 27 which is rigidly attached to the roller shaft 28. The roller 29 has its outer surface slotted as shown, each slot having a substantially radially extending side 30 and a slanting side 31. See Fig. 4. The roller is so positioned and turned in such a direction as to cause the walls 30 to act upon the dough or the like to force it downwardly into the lower compression chamber of the hopper.

It will be noted that my roller has two series of slots, indicated generally at 33 and 34, separated by a land 35, these slots being staggered with respect to each other.

As shown in detail in Fig. 8, the roller 29 has steel discs 36 welded thereto at 37. Both ends of the roller have identical construction. The steel disc 36 is welded to the shaft 28, as indicated by the arrow 38. See Fig. 4. A brass plate 39 is located between the steel disc and the inner side of the wall 12. A similar brass plate is, of course, located at the other end of the roller.

As is shown in Figs. 4 and 8, a curved strip 41 is welded at 42 onto the end wall 12 and extends circumferentially about the roller 29 but just beyond the periphery thereof. A curved plate 43 is welded at 44 onto the strip 41 and extends completely across the hopper. The other end of the plate 43 is similarly attached onto the end wall 13. The upper edge of the plate, as clearly shown in Fig. 4, does not extend upwardly to the plane of the roller axis but is located therebelow, thus permitting the dough to expand somewhat before it is stripped from the roller surface. In other words the beginning of the plate separation is past the point of greatest restriction.

The wall 11, previously referred to, has a bend 45 on the axis plane of the roller and then extends downwardly and outwardly as shown. Its terminal edge is welded at 47 onto the cross piece 48 and this piece 48 extends between the ends 12 and 13 and is rigidly fastened thereto. A similar piece 49, curved at its upper face to match the outside surface of the roller, is likewise fastened to the ends 12 and 13 and forms the front of a frame. End members 50, one of these being shown in Fig. 4, extend between the ends of the pieces 48 and 49.

From the immediately preceding description it will be understood that the members, 49, 48 and 50 form a rectangular frame through which an opening leads downwardly from the compression chamber 52, this chamber lying below the neck of the hopper.

A die member, having a matching frame 53 and a series of nozzles 54, shown in cross section in Fig. 4, is positioned against the underside of the frame attached to the chamber. Cams 55 are revolubly mounted on headed stub shafts 56, see Fig. 7, these shafts being held in the end plates 12 and 13 by set screws. Handles 57 protrude from the cams proper whereby they may be easily turned or rotated. As shown in Fig. 6, rotation of the handle in a counter-clockwise direction will cause the cam to assume the dotted line position and thus contact the end of the frame 53 whereby the die member will be detachably held in position.

As shown in Figs. 4 and 5, a sliding adjustable member 60 is of a length slightly less that the inside of the hopper, this member being slidable upon the inner side of the wall 11. One of its many positions is shown in full lines, another position is shown in dotted lines. Rods 61 extend from the member 60 and are threaded at 62.

The rear wall 11 has two seats located at its upper edge as shown in Fig. 1. Each seat has a lower wall 63, slotted at 64, an upper wall 65, slotted at 66 and end spacing means 67. See Fig. 1. Thus a hollow frame member is formed, the threaded portions 62 of the rods 61 passing through and resting within the slots. Adjusting nuts 68, one for each of the two rods, provide means whereby the blade may be moved up and down in order to control the amount of dough passing through the several nozzles. Or, in other words, the speed of the machine remains constant, but the diameters or sizes of the streams of dough are changed as desired. Thus the portion cut off will have a different amount of dough therein.

Each of the rods 61 is equipped with a locking nut 69, having a set screw 70, to prevent excessive downward movement of the slide member 60.

Referring now again to Figs. 1 and 2, numerals 71 and 72 indicate bearings of any suitable kind, these bearings being located adjacent the outer faces of the end plates 12 and 13 and bolted thereagainst. The shaft 28 is extended and carries cams 73 and 74 thereon, both of these cams having keyways 75 in alinement, see Fig. 9, whereby they are made to revolve with the shaft.

From the above description it will be understood that the shaft 28 carries the main roller 29, the worm wheel 27 at one end and the cams at the other end, the shaft 28 and its appurtenances being bodily removable by taking out the several bolts 76 and then sliding the assembly outwardly along the slots 18.

The end plate 13 has a bearing 77 and the end plate 12 an alined bearing 78, a pivot shaft 79 revolvably seating in these bearings.

Curved arms 80 and 81 are keyed to the shaft 79, as at 82 and 83, and depend therefrom, the lower ends of these curved arms oscillatably receiving the rounded ends 84 of the square shaft 85.

The squared shaft 85 has a plurality of axially adjustable arms 86 bolted thereto at 87, see Figs. 1 and 4, these arms having notched ends to receive the cutting wire 88, and rigid arms 89, welded below the square shaft at 90, have end holes to receive the wire 88, this wire extending through the square shaft at 91 and 92 and being fastened below the heads of the winged nuts 93 and 94. See Fig. 1.

It will be understood that the several arms 86 are adjustable along the shaft in order that they may be located between the nozzles of the particular die structure which is being used. This is necessary in order that the cutting wire may pass immediately below the snout of the nozzle.

Also, it will be readily apparent that the bodily movement of the square shaft 85 is a partial circumference about the pivotal shaft 79 but nevertheless the shaft may turn about its own axis. The right hand end of the shaft 85 is extended, see Fig. 1, and a pitman or rod 95 has one end 96 rigidly fastened thereto.

Figure 3:
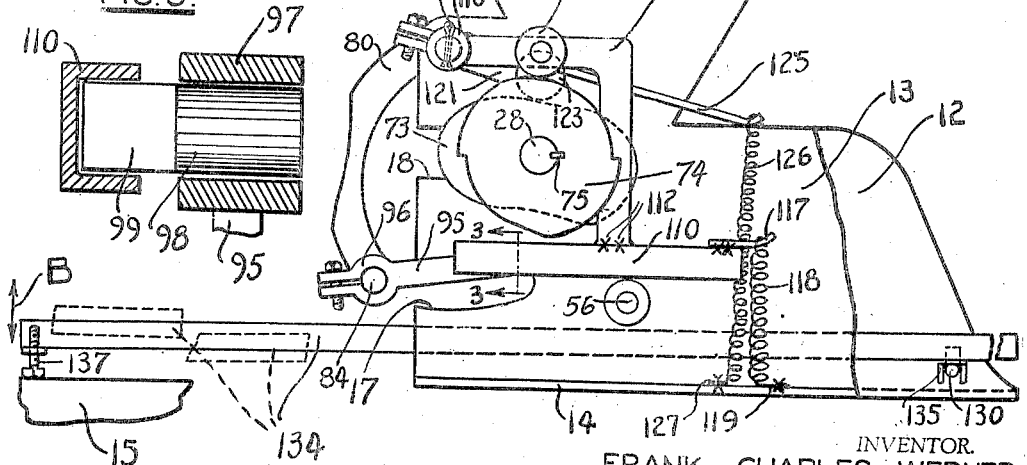
Fig. 3 is an enlarged sectional view taken along the plane of the line 3—3 of Fig. 2.

The other end of the pitman 95, this end being designated 97, see Fig. 3, has a pin 98 turnably mounted therein. A slide 99 is integral with the pin. This slide operates in the track member 110. The track member is carried by the bell crank lever 111, being welded thereto at 112. The upper end of the lever is pivoted at 113 on the shaft 79. A washer and cotter pin 114 may hold this lever in position. The upper arm of the lever carries a roller 115, this roller being in alinement with and riding upon the cam 74 previously referred to. The track member 110 has an extension 117 thereon and a spring 118 fastened to the flange 14 at 119 pulls downwardly upon this extension and thus causes constant engagement between the roller 115 and the cam 74.

The pivot shaft has a second pitman or lever 121 keyed thereto at 122 and the free end carries the roller 123 which roller rides upon the double lobed cam 73. The pitman 121 is extended at 125 and a spring 126 is attached to this extension and also to the flange 14 at 127 whereby the roller 123 constantly rides against the cam 73.

At the lower edge of the end plates 12 and 13, see Fig. 1, short stub pivots 130 and 131 extend inwardly, these having spacers 132 and 133, respectively, attached thereto, and a pan guide 134 is pivoted thereon by the bearings 135 and 136. Adjustable means 137 is provided near the other end of the pan guide. This adjustable means permits the pan guide to be swung upwardly or downwardly as indicated by the arrow B. The dotted line showing, see Fig. 2, indicates the pan guide positioned in several positions.

The operation of the cam structure and its associated system of levers will be readily understood. The cams, shown full size in Fig. 9, and also in their proper superimposed relationship, cause the wire cutter to move in the path as indicated by Fig. 10. This gives two complete cutting cycles or strokes during each single operation of the cam. That is, for each complete revolution of the cam structure, two blanks or lumps of dough are cut off.

While I have described a complete embodiment of my invention, I do not wish to be limited to the particular construction shown, my invention being in fact limited solely by the attached claims.

I claim:

1. In combination with a dough hopper having sides, of a roller for forcing the dough therefrom, means for mounting the roller so that a portion thereof is located within the hopper, means for restricting the neck of the hopper whereby the quantity of dough moved by the roller is reduced, said restriction means comprising a strip member slidably mounted completely within the hopper, and means extending upwardly within the hopper for moving either end thereof as desired.

2. In combination, a hopper for dough or the like, a single roller for forcing the dough therefrom, a shaft for carrying the single roller, means for driving the shaft, a cam on the shaft, a cutting wire, means for mounting the wire for up and down movement and also for swinging movement comprising a frame for the wire, track means for said frame, a pivot for the track means located so that the track means are substantially horizontal at all times, a follower fastened to the track means and associated with the cam whereby the up and down movement of the cutting wire is governed, a second cam on the said shaft, and means between the said second cam and the cutting wire for controlling the swinging movement of the wire in predetermined relationship to its up and down movement.

3. In combination, a shaft, two cams revoluble with the shaft, means for revolving the shaft, a second shaft, an arm rigidly attached thereto, a second arm pivoted onto the free end of the first arm, an operating tool attached to the second arm, means rigid with the second arm, said means having an extension thereon, a channel receiving said extension, said channel having a portion thereof extended and pivoted onto the said second shaft, said portion also contacting one of the cams for moving the said channel, and additional means rigid with the said second shaft and contacting the remaining cam for controlling the oscillating movement of the said second shaft for the purpose described.

4. In combination, two end plates, downwardly converging side plates attached therebetween to form a hopper, a roll extending into the neck of the hopper, shielding means between the lower part of the roll and the chamber below the neck of the hopper, die means for closing the bottom of the said chamber, and cam means pivoted onto the side plates for holding the die means in its associated relationship.

5. In combination, a dough hopper having sides, a roller, means for mounting the roller so that a portion thereof is located within the hopper, one side of the hopper being of non-perforate construction and facing the roller, gate means slidably mounted against the said non-perforate hopper side, and means, attached to the said gate means, extending upwardly interiorly of the hopper for operating the said gate means.

6. In combination, two end plates, downwardly converging side plates attached therebetween to form a hopper, a roll extending into the neck of the hopper, said roll having two sets of axially extending grooves, separated by a land, upon its outer cylindrical surface, elongated flexible shielding means located closely adjacent to the roll and between the lower part of the said roll and the chamber below the neck of the hopper, and means on each end plate for supporting the flexible shielding means.

7. In combination, a hopper for dough or the like, a roller for forcing the dough therefrom, a revoluble shaft for carrying the roller, means for driving the shaft, a cam on the shaft, a cutting wire, means for mounting the wire for an up-and-down movement and also for swinging movement comprising a frame for the wire, track means for said frame, a pivot for the track means located so that the track means are substantially horizontal at all times, a follower fastened to the track means and associated with the cam whereby the up-and-down movement of the cutting wire is controlled, means rotatable with the said shaft, and a second means between the said rotatable means and the cutting wire for controlling the swinging movement of the wire in predetermined relationship to its up-and-down movement.

8. In combination, a hopper for dough or the like, egressing means for the dough, means for mounting the said egressing means at one side of and near the bottom of the hopper, sliding means located at the other side of the hopper and near the bottom thereof, supporting means attached to the said sliding means, said supporting means extending upwardly inside of the hopper, seating means rigidly attached onto the top of the hopper, said seating means receiving the said supporting means.

9. A combination of elements as set forth in claim 8 in which the said supporting means comprises a rod, the upper end thereof being threaded and carrying a nut thereon, the seating means comprising two spaced walls slotted to detachably receive the rod and being sufficiently spaced to receive the nut therebetween.

FRANK CHARLES WERNER.